(12) United States Patent
Feague (10) Patent No.: US 6,247,135 B1
(45) Date of Patent: Jun. 12, 2001

(54) SYNCHRONIZATION PROCESS NEGOTIATION FOR COMPUTING DEVICES

(75) Inventor: Roy W. Feague, Scotts Valley, CA (US)

(73) Assignee: Starfish Software, Inc., Scotts Valley, CA (US)

( * ) Notice: Subject to any disclaimer, the term of this patent is extended or adjusted under 35 U.S.C. 154(b) by 0 days.

(21) Appl. No.: 09/287,546

(22) Filed: Apr. 6, 1999

Related U.S. Application Data
(60) Provisional application No. 60/122,592, filed on Mar. 3, 1999.

(51) Int. Cl.$^7$ ............................................. G06F 7/20
(52) U.S. Cl. ............................................. 713/400; 707/201
(58) Field of Search .................................... 713/400, 600; 707/201

(56) References Cited

U.S. PATENT DOCUMENTS

| | | | |
|---|---|---|---|
| 5,884,325 | * 3/1999 | Bauer et al. | 707/201 |
| 5,897,640 | * 4/1999 | Veghte et al. | 707/202 |
| 5,974,238 | * 10/1999 | Chase, Jr. | 395/200.78 |
| 6,006,274 | * 12/1999 | Hawkins et al. | 709/248 |

* cited by examiner

*Primary Examiner*—Dennis M. Butler
(74) *Attorney, Agent, or Firm*—John A. Smart (57) ABSTRACT

A methodology providing "synchronization process negotiation" is described. Synchronization process negotiation is the methodology of negotiating between two or more devices exactly what synchronization process (protocol) is to be employed to effect synchronization of the devices. The methodology, which is adaptable to existing synchronization protocols, takes into account the actual synchronization capabilities or built-in support (if any) of each device whose data is to be synchronized (e.g., by a synchronization engine). The methodology may be implemented by adapting a given synchronization protocol (which itself may be one of a variety of types) to include a "negotiation phase" at the beginning of the synchronization, during which the devices involved will exchange information about the capabilities of one or more devices. The individual attributes for a client are communicated as synchronization parameters in attribute/value pair form. Once this negotiation phase has been completed, the synchronization can then proceed in a manner that is most efficient for the features available.

42 Claims, 5 Drawing Sheets

SYNCHRONIZATION PROCESS NEGOTIATION FOR COMPUTING DEVICES

RELATED APPLICATIONS

The present application claims the benefit of priority from and is related to the following commonly-owned U.S. provisional application: application Ser. No. 60/122,592, filed Mar. 3, 1999. The disclosure of the foregoing application is hereby incorporated by reference in its entirety, including any appendices or attachments thereof, for all purposes. The present application is also related to the following commonly-owned U.S. patent applications, the disclosures of which are hereby incorporated by reference in their entirety, including any appendices or attachments thereof, for all purposes: application Ser. No. 09/020,047, filed Feb. 6, 1998, and entitled METHODS FOR MAPPING DATA FIELDS FROM ONE DATASET TO ANOTHER IN A DATA PROCESSING ENVIRONMENT; application Ser. No. 09/136,215, filed Aug. 18, 1998, and entitled SYSTEM AND METHODS FOR SYNCHRONIZING TWO OR MORE DATA SETS; application Ser. No. 08/923,612, filed Sep. 4, 1997, and entitled SYSTEM AND METHODS FOR SYNCHRONIZING INFORMATION AMONG DISPARATE DATASETS.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to synchronization of data—that is, the process of taking two different stores of data ("data stores"), comparing them to identify differences, and applying changes to one or both to make them identical. More particularly, the present invention relates to a methodology for negotiating the synchronization process that is to occur among two or more computing devices, in a data-processing or computing environment.

With each passing day, there is ever increasing interest in providing synchronization solutions for connected computing devices, particularly information appliances. These "appliances" appear in the form of electronic devices including, but not limited to, cellular phones, pagers, other hand-held devices (e.g., REX™, PalmPilot™ and Windows™ CE devices), personal computers (PCs) of all types and sizes, and Internet or intranet access devices (e.g., PCs or embedded computers running, for example, Java virtual machines or browsers or Internet Protocol (IP) handlers).

These devices, and the software applications running on these devices, do not communicate particularly well with one another and are typically not designed with data synchronization in mind. Therefore, a problem exists as to how one integrates information —such as calendaring, scheduling, and contact information —among disparate devices and software applications. Consider, for instance, a user who has his or her appointments on a desktop PC at work, but also has a notebook computer at home, and a battery-powered, handheld device for use in the field. What the user really wants is for the information (e.g., appointments) in each device to remain synchronized with corresponding information in all devices in a convenient and transparent manner. Still further, some devices (e.g., PCs) are typically connected at least occasionally to a server computer (e.g., an Internet server which stores information for the user). The user would, of course, like the information on the server computer to participate in the synchronization so that the server also remains synchronized.

An early approach to maintaining consistency between data sets was to import or copy one data set on top of another. This simple "one-way" approach, which overwrites a target data set without any attempt at reconciling any differences, is inadequate for all but the simplest of applications. Not unexpectedly, more sophisticated synchronization techniques were developed. In particular, techniques were developed for synchronization of exactly two data sets by attempting to reproduce in each data set the changes found in the other data set since a previous synchronization. A detailed review of different synchronization techniques can be found in the Background section of commonly-owned application Ser. No. 08/923,612, filed Sep. 4, 1997, and entitled SYSTEM AND METHODS FOR SYNCHRONIZING INFORMATION AMONG DISPARATE DATASETS, the disclosure of which is hereby incorporated by reference in its entirety, including any appendices or attachments thereof, for all purposes.

Today, a variety of approaches exist for synchronizing information residing on multiple computing or information-storing devices. Consider, for instance, the task of synchronizing respective data sets or "data stores" residing on a given pair of devices. Here, the particular synchronization process employed depends on the capabilities of the individual devices. Consider, for instance, the following two examples:

Example 1: A synchronization or "sync" engine communicating with a fairly primitive device may have to obtain a complete copy of the data store from the device, do the comparison, and then re-write the entire data store back to the device.

Example 2: The same sync engine, when communicating with a higher-level device, may be able to send a request to the other (target) device for all changes to the data store that were made after the last sync date. The target device will then transmit only those changes, reducing the amount of data that is transmitted and the time required for synchronization.

Each example will be reviewed in turn.

Example 1 indicates a primitive synchronization process, where a synchronization engine must communicate with a primitive device (e.g., one not including any native support for synchronization). In such a case, the synchronization engine must follow a resource-intensive (and typically slow) process. First, the synchronization engine requests the entire data store from the device and then proceeds to determine what differences exist in the data store by comparing it to a previously-stored copy of the data store. After applying any necessary changes (i.e., for creating a data store that is synchronized according to user-specified configuration), the synchronization engine must now transmit the entire copy back to the primitive device.

Example 2 indicates a higher-level synchronization process, in which the synchronization engine communicates with a device having at least some degree of support for synchronization. Support might include, for example, the ability of the device to transmit to the synchronization engine any new or modified records as of a certain date. Typically, the level of synchronization support is due in part to what is stored in the data store, the type of program functionality (i.e., software features) that is available, and the processing power that is available for the synchronization interface (to that device). Beyond the disparate levels of synchronization illustrated by the preceding examples, a variety of other possible levels exist, each one taking advantage of the features of a particular device to get the most efficient synchronization possible.

A problem exists with these present-day approaches, however. In order for two devices to synchronize together (i.e., participate in a synchronization session), they have to have some means of communication—that is, a "synchronization protocol". With existing solutions, however, a "hard-wired" protocol (i.e., one supporting only a particular device, such as a Palm Pilot device) is employed. As a result, the protocol employed is specific to the needs and features of a particular device, at the expense of not supporting other devices. From the perspective of the software developer, one creates a device-specific "accessor" (i.e., driver capable of accessing data) for a particular target device, with the requirement that the developer knows the particular synchronization capabilities of the target device beforehand. The problem with such an approach, however, is that the synchronization driver is tied to a specific device; it cannot be effectively re-used from one device to another. As the target device itself typically undergoes revision, the device-specific driver soon becomes obsolete, since it does not support newer versions of the very same device for which it was specifically designed.

Recently, some attempts have been made to create generalized synchronization protocols. However, instead of handling a variety of different device synchronization-support levels, these protocols assume some particular level of synchronization support, and only devices capable of that level of support can be synchronized. Here, such a protocol attempts to provide some degree of reuse by adopting a common denominator for target devices using that protocol. This approach is also problematic. Quite simply, if a device does not meet the common denominator, it is completely shut out from use of the protocol, despite the fact that the device may actually include some degree of built-in synchronization support (which could have been used to optimize synchronization). In other words, the approach has no capability to support those devices which, although not adhering completely to the specified protocol, have at least some intermediate level of synchronization support. Therefore, the approach is only an incremental improvement over the above-described single-device protocol.

What is needed are systems and methods that support a generalized synchronization protocol, yet do so in a manner which is adaptable to the capabilities of a particular target device. In such a case, the target device is not required to have a particular degree of synchronization support in order to use the protocol. Instead, the protocol allows the synchronization process to proceed in the most efficient manner possible, given the level of synchronization support provided by the target device, whatever level that might be. The present invention fulfills this and other needs.

SUMMARY OF THE INVENTION

The present invention provides a methodology for "synchronization process negotiation"—that is, negotiating between two or more devices exactly what synchronization process (protocol) is to be employed to effect synchronization of the devices. The methodology, which is adaptable to existing synchronization protocols, takes into account the actual synchronization capabilities or built-in support (if any) of each device whose data is to be synchronized (e.g., by a synchronization engine).

More particularly, the present invention may be implemented by adapting a given synchronization protocol (which itself may be one of a variety of types) to include a "negotiation phase" at the beginning of the synchronization, during which the devices involved will exchange information about the capabilities of one or more devices. Once this negotiation phase has been completed, the synchronization can then proceed in a manner that is most efficient for the features available. The present invention itself is actually independent of any particular literal protocol, as it may be incorporated into a variety of different synchronization protocols, as well as different devices or different communication (message transport) layers. Therefore, the focus of the present convention is, instead, on the adaptation of a synchronization protocol to incorporate a basic mechanism for negotiating the synchronization process before synchronization begins, thereby governing how synchronization proceeds.

In internal system operation, the present invention operates by introducing the ability for a synchronization system's engine (sync engine) to query the client or target device about a particular attribute and to find out what the device's capabilities are in that respect. The individual attributes for a client are communicated as synchronization parameters, in attribute/value pair form. For example, the present invention introduces a "RECORD_FILTERING" parameter, which may be communicated from the client back to the synchronization engine, to allow the synchronization engine to determine what the client's capabilities are with respect to filtering records from synchronization. The parameter may be set to one of the following values:

RECORD_FILTERING={NONE|HEADERS|SINCE_X}

NONE indicates that the client does not provide any record filtering functionality (i.e., similarly to Example 1 above); the client can only give the entire data store. HEADERS indicates that the client can provide record headers. Here, the client cannot pick out what has changed, but it can provide a snapshot summary that is smaller than all of the data (from which the synchronization engine can then determine changes). SINCE_X indicates that the client can provide records as of a particular "Sync Anchor" value, where X indicates a time stamp or change counter value (i.e., similarly to Example 2 above). Here, the client is capable of giving records which have changed from a particular value (e.g., time stamp value for a particular date and time) given by the synchronization engine.

In the event that the client can provide headers, the sync engine needs to know what sort of information to expect in those headers in order to perform synchronization. Possibilities include the following:

1. Headers include a CRC (cyclic redundancy checking) value for each record.
2. Headers include a modification time (time stamp) for each record.
3. Headers include a change counter for each record. These three options are reflected in a "CHANGE_TRACKING" parameter, which indicates what the device's capabilities are in terms of knowing what has changed. This parameter may be set to one of the following values:

CHANGE_TRACKING={NONE|CRC|TIMESTAMP|CHANGE_COUNTER }

NONE indicates that the device or client has no ability to determine if something has changed in its data store. CRC indicates a CRC value for each record; TIMESTAMP indicates a modification time for each record; and CHANGE_COUNTER indicates a change count value for each record.

Clients which cannot support a "SINCE_X" access method must either transmit their entire data store or transmit headers. For such clients, the sync engine will need to request the desired records from the device. For example, if the synchronization engine has determined, based on a comparison of CRC values, that a particular record has changed, the synchronization engine needs a means to request that record from the device. Different devices will provide different levels of access and different types of access to their records, however. Therefore, a third parameter is required for specifying what type of access is provided.

The types of record access that devices can support include the following:

1. The device can only transmit and receive the entire data store as a block; it is not possible to request or submit individual records.
2. The device provides "static index" access to the records (i.e., there are a fixed number of record storage "slots" and the sync engine can request and submit records based on this slot number. The records may move to different slots in between synchronizations, so there is no lasting fixed correlation between a slot number and a record).
3. The device provides "unique IDs" for each record, and the sync engine can request and submit individual records using these IDs. Unique IDs are guaranteed to be unique within a particular data store, and the association between a record and its ID is never broken.

These three options are reflected in a "RECORD_ACCESS" parameter, which may take one of the following values:

RECORD_ACCESS={BLOCK|STATIC|UNIQUE }

BLOCK record access indicates that the device can only give access to the entire set or "block" of records (i.e., the entire data store); this is the most primitive type of record access. STATIC record access indicates a static index mechanism. UNIQUE indicates that each record within the data store is represented by a unique ID, within the scope or context of that particular data store (or, if desired, globally unique). Here, the relationship between the unique identifier and the record is fixed or permanent. This level of record access allows the synchronization engine to get and put an individual record, based on the ID.

A methodology of the present invention for synchronizing a first data set residing on a first device with a second data set residing on a second device may be summarized as follows. At the outset, a communication link is established between the two devices; this step may be performed in a conventional manner, such as connecting the two devices via a serial cable or via a local area network (LAN). This allows the second device to query the synchronization capabilities of the first device, by transmitting a request to the first device for the specific synchronization capabilities of the first device. In response to this request, the first device transmits back to the second device information indicating the specific synchronization capabilities of the first device. (If desired, the exchange of information about synchronization capabilities may be extended to be bilateral or mutual in nature (or multilateral, in the case of three or more devices), such that the second device also communicates its synchronization capabilities back to the first device.) Now, based on the given synchronization capabilities of the first device, a synchronization protocol may be selected for synchronizing the respective data sets of the two devices. Therefore, synchronization of the first and second data sets proceeds using the selected synchronization protocol, so that the synchronization process is performed in a manner optimized for the available synchronization capabilities (e.g., of the first device).

DETAILED DESCRIPTION OF A PREFERRED EMBODIMENT

The following description will focus on the presently-preferred embodiment of the present invention, which is operative in an environment typically including a variety of computing or information-storing devices (e.g., desktop computers, server computers, and portable computing devices), that are occasionally or permanently connected to one another where synchronization support is desired. For purposes of discussion, the following description will present examples in which it will be assumed that there exists a "server" or "synchronization ("sync") engine" which has one data store locally, and a "client' or remote device which has a second data store to be synchronized. The present invention, however, is not limited to any particular environment or device. In particular, a client/server distinction is neither necessary to the invention nor even necessarily desirable, but is used to provide a framework for discussion. The focus of the following description, therefore, is not focused on a particular synchronization/hardware configuration (as the present invention may be advantageously applied to a variety of disparate configurations). Instead, the following description will focus on the application of synchronization negotiation or dialog among two or more devices, which may be configured in a variety of hardware configurations (e.g., according to the particular needs of the user). Therefore, the following description is for the purposes of illustration and not limitation.

Brief Overview of Synchronization

A. Introduction

Many software applications, such as personal productivity applications like Starfish Sidekick® and Lotus® Organizer, have sets of data or "data sets" (e.g., address books and calendars). Consider, for instance, a user scenario where an account executive needs to coordinate contacts and events with other employees of the XYZ corporation. When traveling, the executive carries a laptop PC with Starfish Sidekick® installed. At home, she and her husband use Lotus® Organizer to plan their family's activities. When on family outings, the account executive carries her PalmPilot™ hand-held organizer. As the foregoing illustrates, a user often needs a means for synchronizing selected information from the data sets his or her applications rely upon. The account executive would not want to schedule a business meeting at the same time as a family event, for example.

Conventionally, the process of synchronizing or reconciling data sets has been a binary process —that is, two logical data sets are synchronized at a time. Any arbitrary synchronization topology will be supported. Here, the system guarantees synchronization stability and the avoidance of undesirable side effects (cascading updates, record duplication, or the like). Data sets do not need to be directly connected but, instead, can be connected via a "store-and-forward" transport, such as electronic mail.

B. Synchronization design

1. Synchronization type

Data set synchronization may, for convenience of description, be divided into two types: content-oriented and record-oriented. Content-oriented synchronization correlates data set records based on the values of user-modifiable fields. Value correlation requires semantic (or at least advanced syntactic) processing that the human brain is very good at and computers are not. For example, a record in one data set with a name field valued "Johann S. Bach" and a record in a second data set with a name field valued "J. S. Bach" could possibly refer to the same real-world person. A human being might arrive at this conclusion by correlating associated data (addresses) or drawing upon external information (e.g., Bach is an unusual name in the U.S.). Creating program logic or code with the ability to make these types of decisions is computationally very expensive.

Record-oriented synchronization correlates data set records by assuming that each record can be uniquely identified throughout its lifetime. This unique identifier is usually implemented as a non-modifiable, hidden field containing a "Record ID"Record-oriented synchronization algorithms usually require maintaining a mapping from one set of record IDs to another. In a preferred embodiment, the system employs record-oriented synchronization.

Record-oriented synchronization is conceptually simple and may be summarized as follows. In the rules below, A and B refer to two data sets which have a synchronization relationship. The rules are assumed to be symmetrical.

1. A and B must track similar types of data (e.g., if A is an address book, then B must be an address book).
2. A record created in A, will create a record in B.
3. A record modified in A, will modify the corresponding record in B.
4. If record A1 has been modified in A and the corresponding record B1 has been modified in B, the record with the latest time stamp (also, "timestamp") takes precedence.

The rules presented above reduce the occurrence of undesirable side effects with a network of synchronized data sets.

2. Time stamps

The actual synchronization logic in synchronization systems often needs to make processing decisions based on comparing the time at which past events occurred. For example, it is necessary to know if a record was modified before or after the last synchronization transaction. This requires recording the time of various events. A "time stamp" value may be employed for this purpose. Typically, data sets involved in synchronization support time stamps, or can be supplied with suitable time stamps, in a conventional manner. In conjunction with the usage of time stamps to compare the relative timing of record creation or modification, the clocks on the respective devices may themselves be synchronized.

3. Record Transformations

During synchronization, a synchronization system will typically transform records from one application-usage-schema set to another application-usage-schema set, such as transforming from a Starfish Sidekick® card file for business contacts to a corresponding PalmPilot™ data set. Typically, there is a one-to-one relationship between records in these two data sets, that is, between the source and target data sets. If this is not the case, however, the component of the system that interacts with a non-conforming data set may include logic to handle this non-conformance.

The record transformations themselves are a combination of field mappings and conversions from a source record to a target record. Exemplary types of field mappings include, for instance, the following:

| | |
|---|---|
| 1. Null | Source field has no equivalent field in the target data set and is ignored during synchronization. |
| 2. One-to-One | Map exactly one field in the target data set to one field in the source data set. |
| 3. One-to-Many | Map one field in the target data set to many fields in the source data set, such as parse a single address line to fields for number, direction, street, suite/apartment, or the like. |
| 4. Many-to-One | Map several fields in the target data set to one field in the source data set, such as reverse the address line mapping above. |

Similarly, exemplary field conversions may be defined as follows:

| | |
|---|---|
| 1. Size | Source field may be larger or smaller in size than the target field. |
| 2. Type | Data types may be different, such as float/integer, character vs. numeric dates, or the like. |
| 3. Discrete Values | A field's values may be limited to a known set. These sets may be different from target to source and may be user defined. |

It is often the case that there are significant differences in the number, size, type, and usage of fields between two data sets in a synchronization relationship. The specification of transformations is typically user-configurable, with the underlying system providing defaults.

With an understanding of the basic process of synchronizing information or computing devices, the reader may now better appreciate the teachings of the present invention for providing improved synchronization methodology for synchronizing an arbitrary number of devices (i.e., synchronization clients), as described in further detail below. As will be noted in further detail below, however, the methodology of the present invention for negotiating a particular synchronization process is largely independent of any given synchronization process or synchronization engine. Instead, the methodology of the present invention operates to allow devices participating in a synchronization process to select a specific type of process (or synchronization path of execution for a given synchronization engine), based on the capabilities of one or more of the participating devices. This allows the synchronization process to be optimized based on the built-in synchronization support of the participating devices.

System Hardware and Software

Figure 1A:
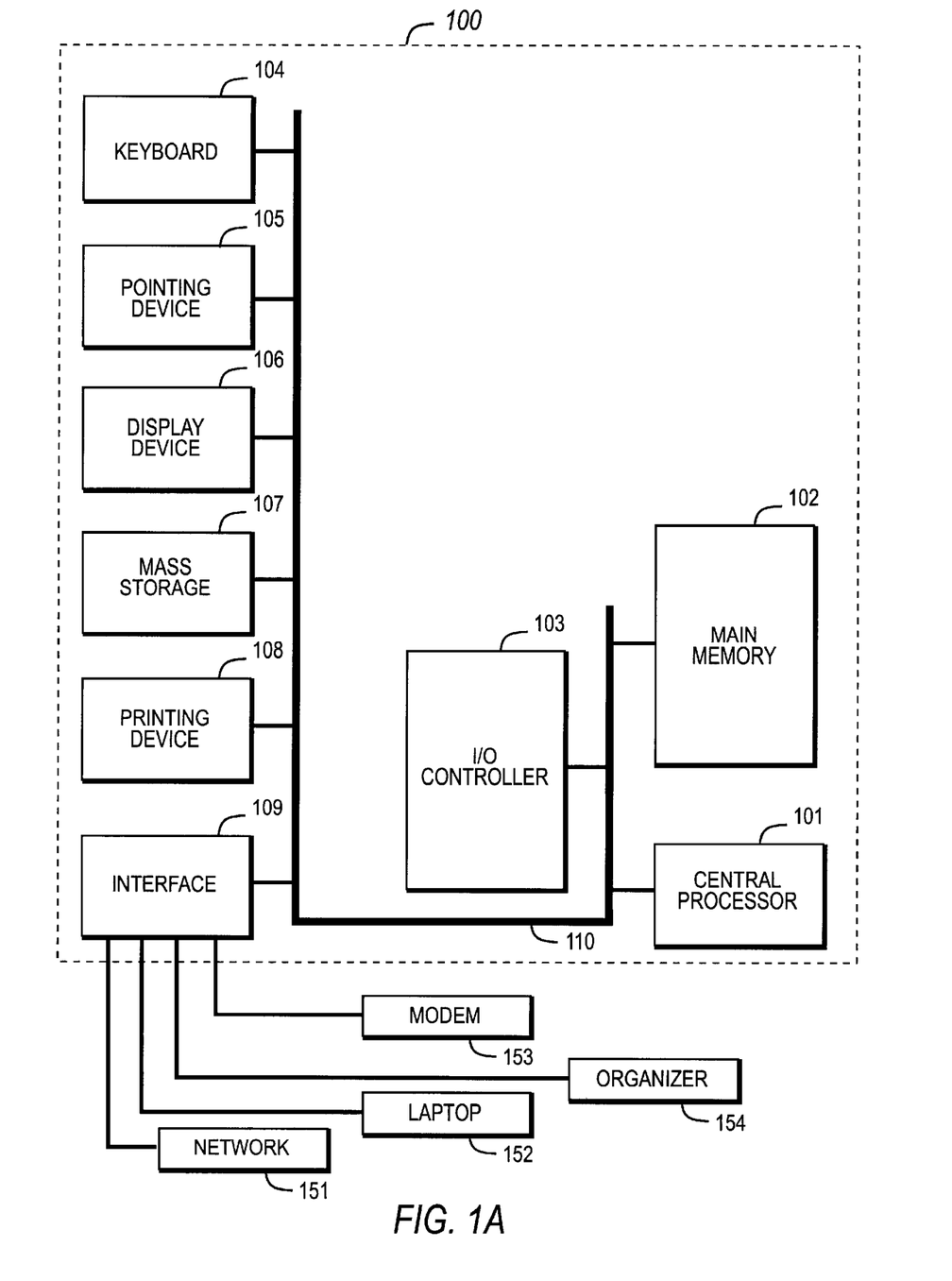
FIG. 1A is a block diagram of a computer system in which the present invention may be embodied.

The present invention may be embodied on an information processing system such as the system 100 of FIG. 1A, which comprises a central processor 101, a main memory 102, an input/output (I/O) controller 103, a keyboard 104, a pointing device 105 (e.g., mouse, pen device, or the like), a screen or display device 106, a mass storage 107 (e.g., hard disk, removable floppy disk, optical disk, magneto-optical disk, flash memory, or the like), one or more optional output device(s) 108, and an interface 109. Although not shown separately, a real-time system clock is included with the system 100, in a conventional manner. The various components of the system 100 communicate through a system bus 110 or similar architecture. In addition, the system 100 may communicate with other devices through the interface or communication port 109, which may be an RS-232 serial port or the like. Devices which will be commonly connected to the interface 109 include a network 151 (e.g., LANs or the Internet), a laptop 152, a handheld organizer 154 (e.g., the REX™ organizer, available from Franklin Electronic Publishers of Burlington, N.J.), a modem 153, or the like.

In operation, program logic (implementing the methodology described below) is loaded from the storage device or mass storage 107 into the main memory 102, for execution by the processor 101. During operation of the program (logic), the user enters commands through the keyboard 104 and/or pointing device 105, which is typically a mouse, a track ball, or the like. The computer system displays text and/or graphic images and other data on the display device 106, such as a cathode-ray tube or an LCD display. A hard copy of the displayed information, or other information within the system 100, may be obtained from the output device 108 (e.g., a printer). In a preferred embodiment, the computer system 100 includes an IBM PC-compatible personal computer (available from a variety of vendors, including IBM of Armonk, N.Y.) running Windows 9x or Windows NT (available from Microsoft Corporation of Redmond, Wash.). In a specific embodiment, the system 100 is an Internet, intranet, or other type of network server and receives input from, and sends output to, a remote user via the interface 109 according to standard techniques and protocols.

Figure 1B:
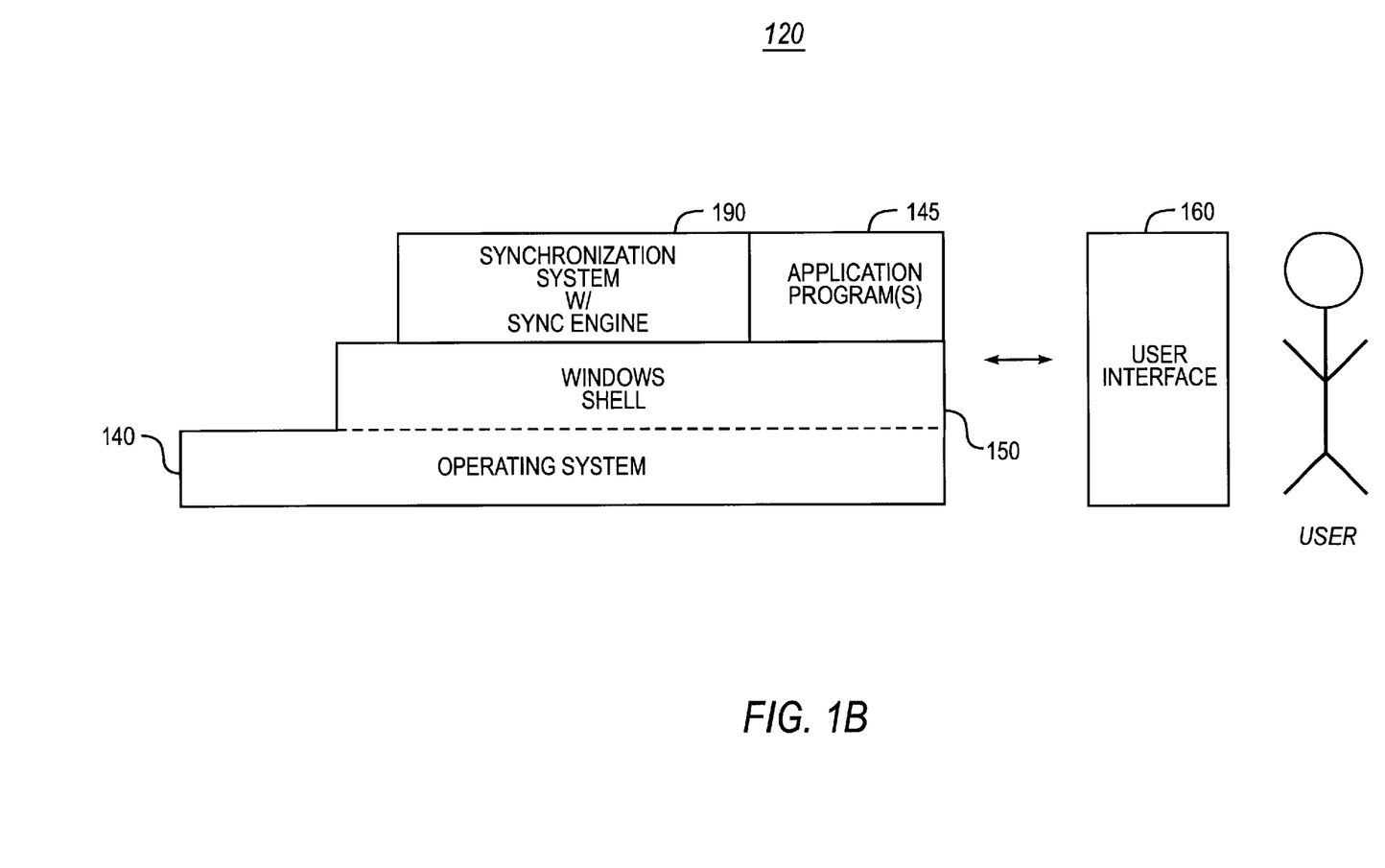
FIG. 1B is a block diagram of a software system of the present invention for controlling operation of the computer system of FIG. 1A.

Illustrated in FIG. 1B, a computer software system 120 is provided for directing the operation of the computer system 100. Software system 120, which is stored in system memory 102 and on storage 107 (e.g., disk memory), includes a kernel or operating system (OS) 140 and a windows shell 150. One or more application programs 145, such as client application software or "programs" may be "loaded" (i.e., transferred from storage 107 into memory 102) for execution by the system 100.

System 120 includes a user interface (UI) 160, preferably a Graphical User Interface (GUI), for receiving user commands and data and for producing output to the user. These inputs, in turn, may be acted upon by the system 100 in accordance with instructions from operating system module 140, windows module 150, and/or client application module (s) 145. The UI 160 also serves to display the user prompts and results of operation from the OS 140, windows 150, and application(s) 145, whereupon the user may supply additional inputs or terminate the session. In the preferred embodiment, OS 140 and windows 150 together comprise Microsoft Windows software (e.g., Windows 9x or Windows NT). Although shown conceptually as a separate module, the UI is typically provided by interaction of the application modules with the windows shell and the OS 140.

Although the methodology of the present invention may be embodied on a single device for synchronizing or reconciling multiple data sets present on that device, the present invention will instead typically be embodied in an environment including two or more computing or information-storing devices, which are occasionally or continually connected. For purposes of the discussion which follows, therefore, it is convenient to consider an embodiment of the present intention in a client/server-like system having a client (e.g., hand-held or portable "organizer" device 154, laptop computer 152, or the like) in communication with a synchronization engine residing on a "host" or "server" computer (e.g., computer system 100). The synchronization engine itself is constructed to effect reconciliation or synchronization among two or more data sets, according to user-specified conditions or criteria. For a description of the details construction and operation of a synchronization engine, see e.g., commonly-owned application Ser. No. 09/136,212, filed Aug. 18, 1998, the disclosure of which has previously been incorporated by reference.

The present invention is not limited to any particular synchronization engine or hardware configuration but, instead, may be advantageously employed in any environment requiring and capable of supporting synchronization of two or more data stores. For example, the laptop computer 152 may serve as the "server" with both the computer system 100 and the organizer device 154 serving as "clients." Hence, for purposes of the present invention, which device functions as a "client" (or multiple devices functioning as "clients") and which device functions as a "server," is largely an arbitrary choice. And in instances where the present invention is employed to support peer-to-peer configurations, the use of "client" and "server" distinctions is in fact not even applicable. Therefore, although the distinction of a particular device being a "client" and another device being a "server" is useful as a framework for presenting exemplary synchronization scenarios for application of the present invention, the present invention itself actually requires no such distinction.

Additionally, the means for communication may be one of a variety of communication means, including serial link (e.g., RS 232 wired link), parallel link, infrared link, wireless (cellular) link, or the like. The present invention is independent of communication means, so long as synchronization messages can eventually be transmitted and received, whether in a synchronous or asynchronous manner. Instead, what is required is an interface to the underlying synchronization protocol (whatever that protocol may be), so that there exists some means of initiating a synchronization session which is adapted to include a negotiation phase of the present invention, as described below. Typically, the interface would be implemented in program code existing at the target device and complementary program code existing at the synchronization engine, so that the two may exchange messages or commands (including parameter information) in the format specified by the particular synchronization protocol. The synchronization protocol should, however, at least allow the exchange of attribute information, so that synchronization attributes of the target device may be communicated to the synchronization engine.

Synchronization Process Negotiation

A. Overview

The present invention introduces into a given synchronization protocol (which itself may be one of a variety of types) a "negotiation phase" at the beginning of the synchronization, during which the devices involved will exchange information about the capabilities of one or more devices. Typically, the capabilities of the client device are the limiting factor for synchronization, so that the negotiation phase may proceed by only including enumeration of the client's capabilities. Once this negotiation phase has been completed, the synchronization can then proceed in a manner that is most efficient for the features that are available. The present invention itself is actually independent of any particular literal protocol, as it may be incorporated into a variety of different synchronization protocols, as well as different devices or different communication (message transport) layers. Therefore, the focus of the present convention is, instead, on the adaptation of a synchronization protocol to incorporate a basic mechanism for negotiating the synchronization process before synchronization begins, thereby governing how synchronization proceeds.

B. Synchronization processes

From the perspective of a synchronization engine, a given synchronization process may be divided into the following basic steps (using the above-described client/server framework for discussion):

1. Figure out what records have changed on the client (i.e., target device).
2. Reconcile those changes with the local data store.
3. Update the client data store appropriately.

How these three steps are actually performed varies significantly from one client to another, depending upon the capabilities of the underlying device. For instance, as previously illustrated in Example 1 and Example 2 above, the task of figuring out what records have changed on the client varies considerably, depending on capabilities of the client. Therefore, of particular interest herein is the process to be used for these steps that is negotiated in the "negotiation phase" before synchronization begins.

With regard to step 1 above, three different ways exist that a sync engine can figure out what has changed on the client:

1. Download the entire data store and compare to a previously stored copy (slowest).
2. Download a set of record "headers" (e.g., containing time stamp or signature/checksum information) which can be compared to a previous copy to determine what has changed. This approach is faster than #1, since less information is transmitted.
3. Ask the device to transmit all the records which have changed since a particular "Sync Anchor" value (fastest). Here, Sync Anchor refers to a value, such as a time stamp or a change counter (e.g., value incremented each time a record is changed), that allows one to determine whether a record has changed since a particular point in time, usually since last synchronization. This is a value which is associated with a particular record and is changed whenever the record is changed. The sync engine can then compare this value to a previously stored value to detect that changes have been made.

The present invention introduces the ability for the synchronization engine to query the client or target device about a particular attribute, to find out what the device's capabilities are in that respect. (As previously described, the approach is adaptable to a variety of different synchronization engines, including for example the synchronization engine described by application Ser. No. 09/136,212). Given the above ways in which a synchronization engine can determine what has changed on a client, the present invention introduces a "RECORD_FILTERING" parameter, to allow the synchronization engine to determine what the client's capabilities are with respect to these three processes (i.e., with respect to filtering records from synchronization). The parameter may be set to one of the following values:

RECORD_FILTERING={NONE|HEADERS|SINCEX_X}

NONE indicates that the client does not provide any record filtering functionality (i.e., process #1 above); the client can only give the entire data store. HEADERS indicates that the client can provide record headers (i.e., process #2 above). Here, the client cannot pick out what has changed, but it can provide a snapshot summary that is smaller than all of the data (from which the synchronization engine can then determine changes). SINCE_X indicates that the client can provide records as of a particular "Sync Anchor" value, where X indicates a time stamp or change counter value. Here, the client is capable of providing records which have changed from a particular value (e.g., time stamp value for a particular date and time) given by the synchronization engine.

In the event that the client can provide headers, the sync engine needs to know what sort of information to expect in those headers in order to perform synchronization. Possibilities include the following:

1. Headers include a CRC (cyclic redundancy checking) value for each record.
2. Headers include a modification time (time stamp) for each record.
3. Headers include a change counter for each record.

These three options are reflected in a "CHANGE_TRACKING" parameter, which indicates what the device's capabilities are in terms of knowing what has changed. This parameter may be set to one of the following values:

CHANGE_TRACKING={NONE|CRC|TIMESTAMP|CHANGE_COUNTER }

NONE indicates that the device or client has no ability to determine if something has changed in its data store. CRC indicates a CRC value for each record; TIMESTAMP indicates a modification time for each record; and CHANGE_COUNTER indicates a change count value for each record.

Clients which cannot support a "SINCE_X" access method must either transmit their entire data store or transmit headers. For such clients, the sync engine will need to request the desired records from the device. For example, if the synchronization engine has determined, based on comparison of CRC values that a particular record has changed, the synchronization engine needs a means in order to request that record from the device. Different devices will provide different levels of access and different types of access to their records, however. Therefore, a third parameter is required for specifying what type of access is provided.

The types of record access that devices can support include the following:

1. The device can only transmit and receive the entire data store as a block; it is not possible to request or submit individual records.
2. The device provides "static index" access to the records (i.e., there are a fixed number of record storage "slots" and the sync engine can request and submit records based on this slot number. The records may move to different slots in between synchronizations, so there is no lasting fixed correlation between a slot number and a record).
3. The device provides "unique IDs" for each record, and the sync engine can request and submit individual records using these IDs. Unique IDs are guaranteed to be unique within a particular data store, and the association between a record and its ID is never broken.

These three options are reflected in a "RECORD_ACCESS" parameter, which may take one of the following values:

RECORD_ACCESS={BLOCK|STATIC|UNIQUE}

BLOCK record access indicates that the device can only give access to the entire set or "block" of records (i.e., the entire data store); this is the most primitive type of record access. STATIC record access indicates a static index mechanism. For example, a Motorola StarTac® phone provides 99 slots for storing phone numbers. A synchronization engine can request, for instance, the contents of slot #5. There is, however, no association between the slot number and the value stored (i.e., record contents), and in fact the phone can shuffle the records around at its discretion. UNIQUE indicates that each record within the data store is represented by a unique ID, within the scope or context of that particular data store. Here, the relationship between the unique identifier and the record is fixed or permanent. This level of record access allows the synchronization engine to get and put an individual record, based on the ID.

B. Example utilizing parameter information

Based on the just-described three synchronization-negotiation parameters of the present invention, the synchronization engine can use the parameters to control the synchronization process and to pick a synchronization process that is optimized for a particular target device. When the sync engine is able to query the device for its synchronization capabilities using these three basic parameters, therefore, it becomes possible for the sync engine to proceed with a method of synchronization that is appropriate to the capabilities of the device. This is perhaps best illustrated by way of example, using the following for synchronization processes.

Consider the following four synchronization processes, with their corresponding parameter values:

Example #1
Synchronization attribute parameters:
  RECORD_FILTERING=NONE
  CHANGE_TRACKING=NONE
  RECORD_ACCESS=BLOCK
Optimal synchronization process available:
  (a) Obtain complete data store;
  (b) Perform sync locally; and
  (c) Replace entire data store.

Example #2
Synchronization attribute parameters:
  RECORD_FILTERING=NONE
  CHANGE_TRACKING=NONE
  RECORD_ACCESS =STATIC|UNIQUE
Optimal synchronization process available:
  (a) Obtain complete data store;
  (b) Perform sync locally; and
  (c) Replace only affected records.

Example #3
Synchronization attribute parameters:
  RECORD_FILTERING=HEADERS
  CHANGE_TRACKING= CRC|TIMESTAMP|CHANGE_COUNTER
  RECORD_ACCESS=UNIQUE
Optimal synchronization process available:
  (a) Obtain a summary of all records which includes per-record change-tracking information;
  (b) Fetch only the changed records;
  (c) Perform sync; and
  (d) Replace only affected records.

Example #4
Synchronization attribute parameters:
  RECORD_FILTERING=SINCE_X
  CHANGE_TRACKING=TIMESTAMP|CHANGE_COUNTER
  RECORD_ACCESS=UNIQUE
Optimal synchronization process available:
  (a) Request only the changed records from the device;
  (b) Perform sync; and
  (c) Replace only the affected records.

The following illustrates an exemplary communication session for such a case.

TABLE 1

EXEMPLARY COMMUNICATION SESSION

| Client | Server | Notes: |
|---|---|---|
| Login | | |
| | LoginResponse | |
| | Request Sync Attributes | |
| Return Sync Attributes | | |
| | RequestChangesSinceX | |
| UpdateRecord | | |
| UpdateRecord | | |
| LastRecordSent | | |
| | AckLastRecordSent | |
| | | Perform synchronization at server |
| | DeleteRecord | |
| | InsertRecord | |
| | UpdateRecord | |
| | LastRecordSent | |
| AckLastRecordSent | | |
| UpdateMap | | (optional details) |
| LastMapSent | | |
| | AckLastMapSent | |
| Logout | | |

This synchronization session demonstrates exchange (e.g., synchronization protocol-based dialog) in which the target device is capable of knowing which records to send to the server, based on the last sync time communicated during login. Here, the server performs synchronization (including, conflict resolution) after receiving all client changes. Alternatively, the server may be configured to perform synchronization or at least some degree of conflict resolution upon receipt of each client record (i.e., process does not wait until receipt of all client records before commencing).

C. Methodology Summarized

FIGS. 2A–E present flow charts illustrating the overall method steps employed for synchronization process negotiation. In step 201, the respective devices establish a communication link (i.e., establish communication link between target device(s), client(s), and synchronization engine). In step 202, the devices exchange acknowledgments for initiating synchronization protocol. In step 203, the devices begin synchronization negotiation by eliciting the synchronization capabilities of the target device(s). This occurs, for instance, by transmitting a request from the synchronization engine to the client for synchronization parameters or attributes of the client. As indicated by step 204, in response to this request, the client transmits synchronization parameters indicating the client's capabilities. In the currently-preferred embodiment, such parameters or attributes include: (1) whether records are filtered (RECORD_FILTER parameter), (2) what type of change tracking (e.g., time stamp or change value) is provided at the client (CHANGE_TRACKING parameter), and (3) what level of record access is afforded by the client (RECORD_ACCESS parameter). Based on the transmitted parameter values, the synchronization engine will select an optimal synchronization process or strategy.

Figure 2A:
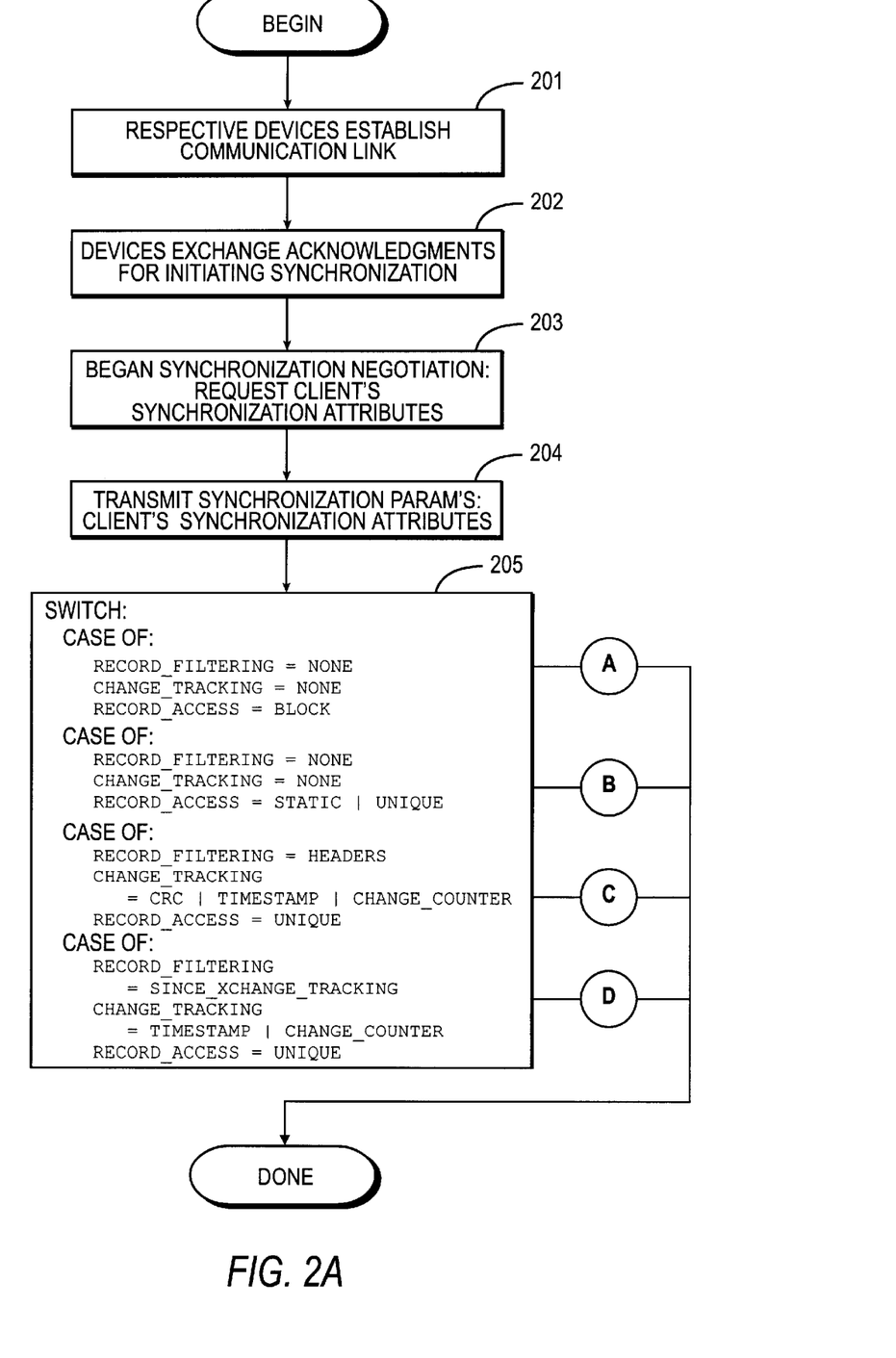
FIGS. 2A–E present flow charts illustrating the overall method steps employed for synchronization process negotiation.
Figure 2B:
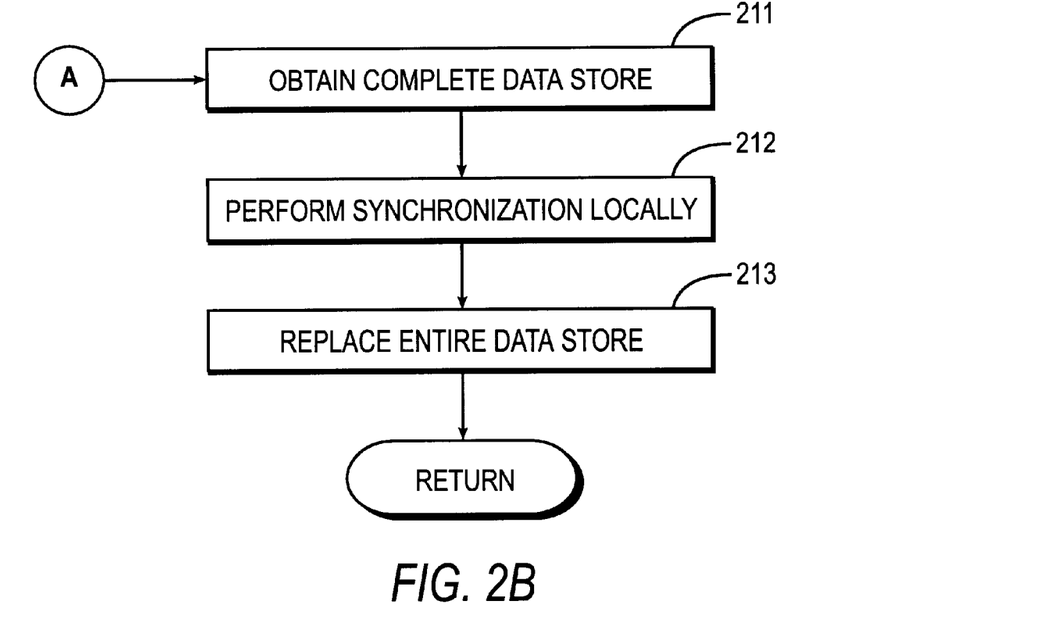
Figure 2C:
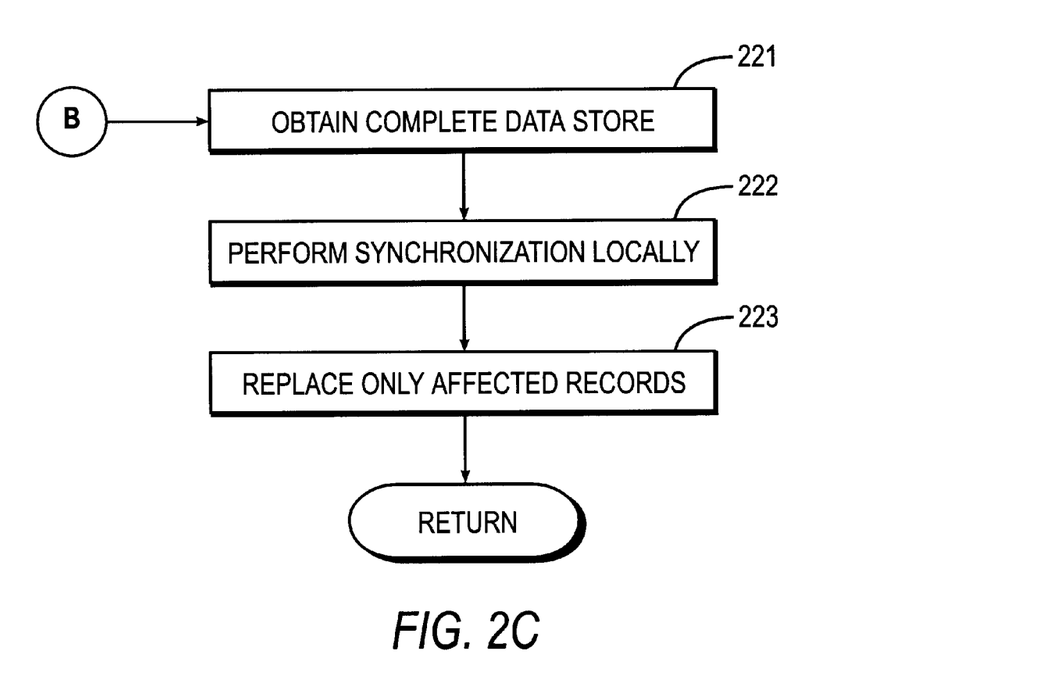

Processing at this point depends on the actual values set in the parameters. In other words, how the synchronization process proceeds from this point on depends, at least in part, on the synchronization capabilities (if any) of the client: a synchronization protocol is selected that allows optimization of the synchronization process, based on client capabilities. The processing logic applied by the method at this point is summarized by step 205. In the event that record filtering is set to "none" change tracking is set to "none" and record access is set to "block" the method proceeds to steps to 211–213 (case instance or condition A). In such a case, the synchronization engine obtains the complete data store (step 211), performs synchronization locally (step 212), and then replaces the entire data store (step 213), as shown in FIG. 2B. In the event that record filtering is set to "none" change tracking is set to "none" and record access is set to "static" or "unique" the method proceeds to steps to 221–223 (case condition B). Here, the synchronization engine obtains the complete data store (step 221), performs synchronization locally (step 222), but then only replaces the affected records (step 223), as shown in FIG. 2C.

Figure 2D:
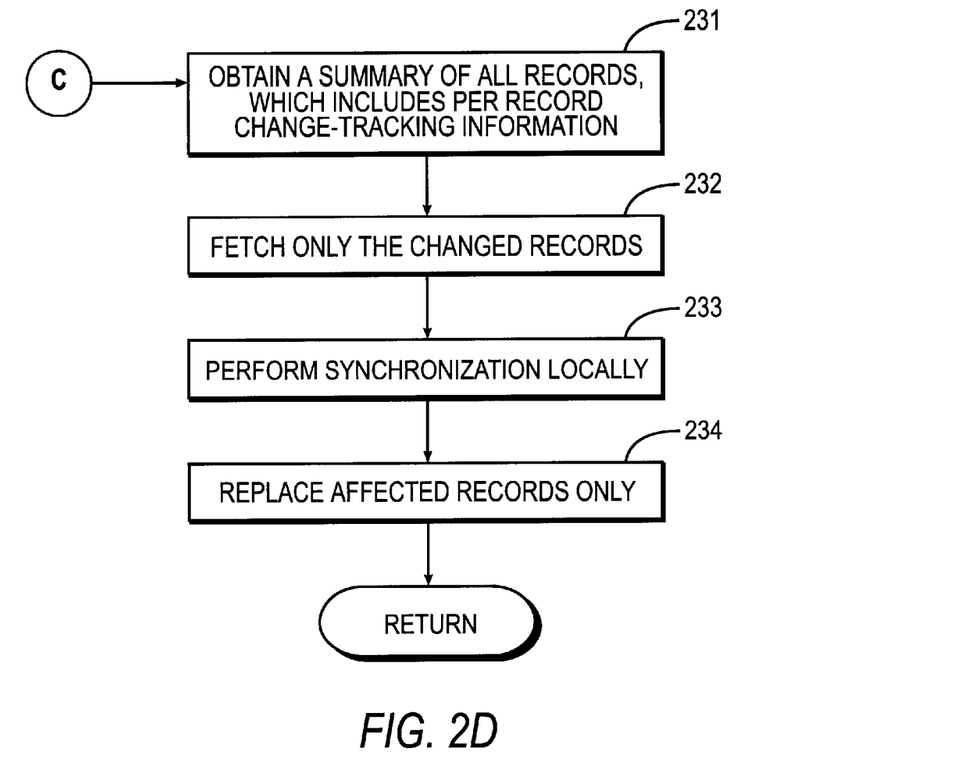
Figure 2E:
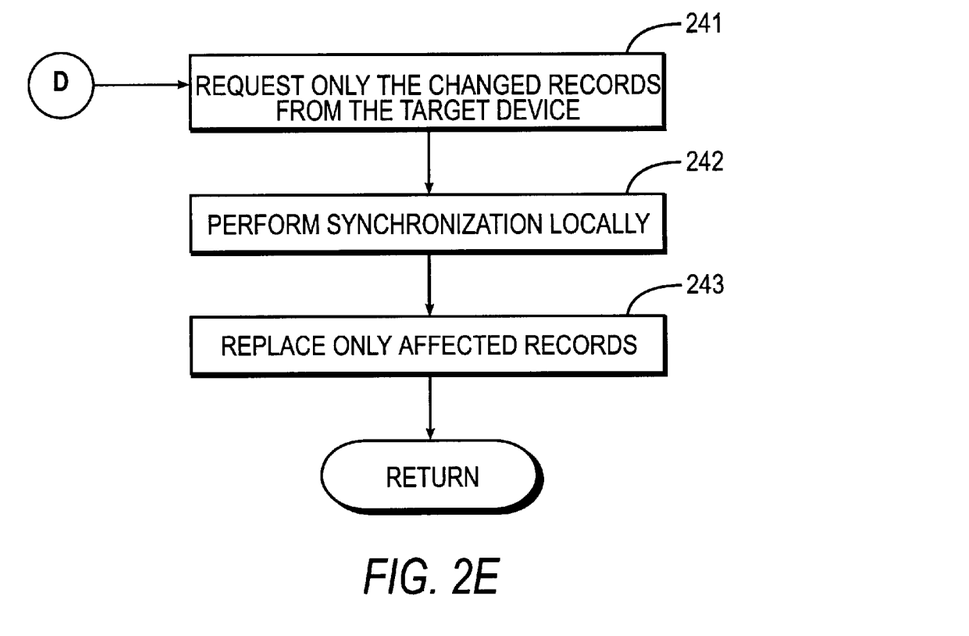

Continuing with the other case conditions, in the event that record filtering is set to "headers" change tracking is set to "CRC" or "timestamp" or "change counter" and record access is set to "unique" the method proceeds to steps to 231–234 (case condition C). In such a case, the synchronization engine obtains a summary of all records which includes per record change-tracking information (step 231), fetches only the changed records (step 232), performs synchronization locally (step 233), and then replaces only the affected records (step 234), as shown in FIG. 2D. In the event that record filtering is set to "since X change" tracking, change tracking is set to "time stamp" or "change counter" and record access is set to "static" or "unique" the method proceeds to steps to 241–243 (case condition D). Here, the synchronization engine requests only the changed records from the target device (step 241), performs synchronization locally (step 242), and then only replaces the affected records (step 243), as shown in FIG. 2E. After conclusion of the proper case condition invocation, the method is done.

The above demonstrates that, based on synchronization parameter combinations, the synchronization engine proceeds with synchronization in a manner selected to optimize the process, based on the capabilities of the particular target device participating in synchronization. The ability of the client to facilitate the process is utilized based on the recognition by the synchronization engine that the client is able to assist in the process. Here, in contrast to hard-wired approaches in prior art systems, the synchronization engine adapts to the capabilities of each individual client, even though each client itself may have a degree of support for synchronization that is quite different than that of other clients. In effect, both the client and the synchronization engine "negotiate" as to the best synchronization process to use. Synchronization then proceeds based on the negotiated or agreed-upon synchronization protocol (which itself can be any one of a number of synchronization protocols).

D. Conclusion

By providing a mechanism to access basic synchronization parameters, the present invention allows a sync engine to effect synchronization among a variety of different devices in a manner that is optimal for the capabilities of each particular device. In this fashion, the amount of traffic (information) over the communication link may be minimized. This is particularly important in configurations having slow communication links (e.g., serial cable link) and/or large amounts of data. Additionally, the amount of work which the synchronization engine must do is minimized. All told, the present invention solves the previously-described problem that exists with these present-day approaches employing a "hard-wired" protocol approach: a synchronization protocol may be negotiated between or among an arbitrary set of devices, such that an optimal synchronization protocol is selected for those devices.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a data processing environment, a method for synchronizing a first data set residing on a first device with a second data set residing on a second device, the method comprising:

establishing a communication link between said first and second devices;

transmitting from the second device to the first device a request for synchronization capabilities of the first device;

in response to said request, transmitting from the first device to the second device information indicating said synchronization capabilities of the first device;

based on said synchronization capabilities of the first device, selecting a synchronization protocol for synchronizing said first and second data sets; and performing synchronization of said first and second data sets using said selected synchronization protocol, wherein said synchronization is performed in a manner optimized for the synchronization capabilities of the first device.

2. The method of claim 1, wherein said communication link comprises a wireless link.

3. The method of claim 1, wherein said communication link comprises a wired link.

4. The method of claim 1, wherein said first and second devices are only occasionally connected via said communication link.

5. The method of claim 1, wherein said first and second devices are persistently connected via said communication link.

6. The method of claim 1, wherein said request for synchronization capabilities of the first device comprises a communication message requesting synchronization parameters from the first device.

7. The method of claim 6, wherein said synchronization parameters comprise attribute/value pairs indicating synchronization capabilities of the first device.

8. The method of claim 6, wherein said synchronization parameters include a record filtering parameter indicating what capability the first device has for filtering records from synchronization.

9. The method of claim 8, wherein said record filtering parameter can express a value of "none" to indicate that the first device has no record filtering capability.

10. The method of claim 8, wherein said record filtering parameter can express a value indicating that the first device has the capability of providing record headers for records of the first data set.

11. The method of claim 8, wherein said record filtering parameter can express a value indicating that the first device has the capability of providing only those records of the first data set which meet a particular condition.

12. The method of claim 11, wherein said particular condition comprises a synchronization anchor value against which records are tested.

13. The method of claim 12, wherein said synchronization anchor value comprises a time stamp value.

14. The method of claim 12, wherein said synchronization anchor value comprises a change counter value.

15. The method of claim 14, wherein said change counter value comprises a value incremented each time a particular record is changed, thereby allowing a device to determine whether a change has occurred to the particular record.

16. The method of claim 6, wherein said synchronization parameters include a change tracking parameter indicating what type of information the first device provides when transmitting record headers.

17. The method of claim 16, wherein said change tracking parameter comprises a selected one of a cyclic redundancy checking (CRC) value, a time stamp value, and a change counter value.

18. The method of claim 6, wherein said synchronization parameters include a record access parameter indicating what level of access the first device provides to other devices.

19. The method of claim 18, wherein said record access parameter comprises a value indicating that the first device can only give access to the entire first data set.

20. The method of claim 19, wherein said value indicating that the first device can only give access to the entire first data set comprises a "block" value.

21. The method of claim 18, wherein said record access parameter comprises a value indicating that the first device can give access to individual records of the first data set through a static index mechanism.

22. The method of claim 21, wherein said value indicating that the first device can give access to individual records of the first data set through a static index mechanism comprises a "static" value.

23. The method of claim 18, wherein said record access parameter comprises a value indicating that the first device can give access to individual records of the first data set using a unique identifier for each record.

24. The method of claim 23, wherein said value indicating that the first device can give access to the individual records of the first data using a unique identifier for each record comprises a "unique" value.

25. The method of claim 23, wherein said value indicating that the first device can give access to the individual records of the first data using a unique identifier indicates that the first device allows other devices to get and put an individual record, based on an ID that is unique to that record.

26. The method of claim 23, each unique identifier for records of the first device is a selected one of an identifier that is unique within the scope of the first device and an identifier that is globally unique.

27. A method for synchronizing a first device having a first data set with a second device having a second data set, the method comprising:

selectively connecting the first device to a second device, for establishing communication between the two devices;

negotiating a synchronization process for synchronizing said first and second data sets by performing substeps of:

sending a request from the second device to the first device for synchronization capabilities of the first device;

in response to said request, transmitting from the first device to the second device synchronization parameters conveying the synchronization capabilities of the first device; and based on said synchronization parameters received from the first device, selecting a synchronization process for synchronizing said first and second data sets; and performing synchronization of said first and second data sets using said selected synchronization process.

28. The method of claim 27, wherein synchronization parameters indicate that the first device provides no record filtering, provides no change tracking, and provides block record access, and wherein said synchronization step is performed by:

(a) transmitting from the first device to the second device an entire copy of the first data set;

(b) performing synchronization locally at the second device, using said copy of the first data set; and (c) once said copy of the first data set has been synchronized, replacing the first data set of the first device with the copy of the first data set which has been synchronized at the second device.

29. The method of claim 27, wherein synchronization parameters indicate that the first device provides no record filtering, provides no change tracking, and provides record access using either a static index or a unique record identifier, and wherein said synchronization step is performed by:

(a) transmitting from the first device to the second device an entire copy of the first data set;

(b) performing synchronization locally at the second device, using said copy of the first data set; and (c) once said copy of the first data set has been synchronized, replacing only those records of the first data set of the first device that are affected by the synchronization.

30. The method of claim 27, wherein said synchronization parameters indicate that the first device provides record filtering using record headers, provides change tracking, and provides record access using a unique record identifier, and wherein said synchronization step is performed by:

(a) transmitting from the first device to the second device a summary of the first data set, which includes per record change-tracking information;

(b) based on said change-tracking information, transmitting from the first device to the second device a copy of only those records of the first data set which have changed;

(c) performing synchronization locally at the second device, using said copy of only those records of the first data set which have changed; and (d) once said copy of the first data set has been synchronized, replacing each record of the first data set of the first device that is affected by the synchronization, using the unique record identifier for each record.

31. A synchronization system comprising:

a communication link between a first data set from a first device with a second data set from a second device;

a synchronization engine for enumerating particular synchronization capabilities of devices and for performing synchronization between data sets;

a synchronization interface capable of responding to said synchronization engine, for transmitting from the first device information indicating the particular synchronization capabilities of the first device; and whereupon said synchronization engine selects a particular synchronization process for synchronizing said first and second data sets, based on the particular synchronization capabilities of the first device, and thereafter performs synchronization of said first and second data sets using said selected synchronization process.

32. The system of claim 31, wherein said communication link is a selected one of a wireless communication link and a wired communication link.

33. The system of claim 32, wherein said wireless communication link comprises a cellular phone link.

34. The system of claim 32, wherein said wired communication link comprises a serial RS232 communication link.

35. The system of claim 31, wherein said communication link comprises a selected one of a synchronous communication link and an asynchronous communication link.

36. The system of claim 31, wherein said synchronization interface resides, at least in part, at said first device.

37. The system of claim 31, wherein said synchronization interface supports communication of synchronization commands and parameters between said first and second devices.

38. The system of claim 31, wherein said information indicating the particular synchronization capabilities of the first device comprises synchronization parameters.

39. The system of claim 38, wherein said synchronization parameters comprise attribute/value pairs indicating synchronization capabilities of the first device.

40. The system of claim 38, wherein said synchronization parameters include a record filtering parameter indicating what capability the first device has for filtering records from synchronization.

41. The system of claim 38, wherein said synchronization parameters include a change tracking parameter indicating what type of information the first device can provide by transmitting only record headers.

42. The system of claim 38, wherein said synchronization parameters include a record access parameter indicating what level of access the first device provides to other devices.

* * * * *